US010689501B2

(12) United States Patent
Tang et al.

(10) Patent No.: US 10,689,501 B2
(45) Date of Patent: Jun. 23, 2020

(54) COMPOSITE POLYESTER MATERIAL, COMPOSITE POLYESTER FIBER, PROCESSES FOR PREPARING THE SAME AND USES THEREOF

(71) Applicant: JINAN SHENGQUAN GROUP SHARE HOLDING CO., LTD., Shandong (CN)

(72) Inventors: Yilin Tang, Shandong (CN); Jinzhu Zhang, Shandong (CN); An Zhang, Shandong (CN); Feng Luan, Shandong (CN); Ding Liu, Shandong (CN)

(73) Assignee: Jinan Shengquan Group Share Holding Co., Ltd., Shangdong (CN)

( * ) Notice: Subject to any disclaimer, the term of this patent is extended or adjusted under 35 U.S.C. 154(b) by 142 days.

(21) Appl. No.: 15/522,476

(22) PCT Filed: Aug. 3, 2016

(86) PCT No.: PCT/CN2016/093116
§ 371 (c)(1),
(2) Date: Apr. 27, 2017

(87) PCT Pub. No.: WO2017/071360
PCT Pub. Date: May 4, 2017

(65) Prior Publication Data
US 2018/0223072 A1 Aug. 9, 2018

(30) Foreign Application Priority Data

Oct. 27, 2015 (CN) .......................... 2015 1 0705758
Oct. 27, 2015 (CN) .......................... 2015 1 0706656
Oct. 27, 2015 (CN) .......................... 2015 1 0707240
Oct. 27, 2015 (CN) .......................... 2015 1 0707397

(51) Int. Cl.
| | | |
|---|---|---|
| *C08K 3/04* | (2006.01) |
| *D01F 1/09* | (2006.01) |
| *D01F 6/92* | (2006.01) |
| *C08L 67/02* | (2006.01) |
| *D01F 1/10* | (2006.01) |
| *C08J 5/00* | (2006.01) |
| *C08J 3/21* | (2006.01) |
| *B29B 7/90* | (2006.01) |
| *B29B 9/06* | (2006.01) |
| *D01D 5/088* | (2006.01) |
| *B29K 67/00* | (2006.01) |
| *B29K 507/04* | (2006.01) |

(52) U.S. Cl.
CPC .................. *C08K 3/04* (2013.01); *B29B 7/90* (2013.01); *B29B 9/065* (2013.01); *C08J 3/212* (2013.01); *C08J 5/005* (2013.01); *C08L 67/02* (2013.01); *D01D 5/0885* (2013.01); *D01F 1/09* (2013.01); *D01F 1/10* (2013.01); *D01F 6/92* (2013.01); *B29K 2067/003* (2013.01); *B29K 2507/04* (2013.01); *C08J 2367/02* (2013.01); *C08K 2201/011* (2013.01)

(58) Field of Classification Search
CPC .. C08K 3/04; C08K 2201/011; D01D 5/0885; B29B 7/90; B29B 9/065; C08J 5/005; C08J 3/212; C08J 2367/02; D01F 6/92; D01F 1/10; D01F 1/09; C08L 67/02; B29K 2507/04; B29K 2067/003
See application file for complete search history.

(56) References Cited

U.S. PATENT DOCUMENTS

| | | | |
|---|---|---|---|
| 2009/0136413 A1 | 5/2009 | Li et al. | |
| 2012/0244333 A1 | 9/2012 | Aksay et al. | |
| 2014/0147645 A1* | 5/2014 | Jung | ................. C09D 5/24 |
| | | | 428/216 |
| 2014/0255500 A1 | 9/2014 | Son et al. | |
| 2015/0307356 A1* | 10/2015 | Zhang | ............... C01B 32/184 |
| | | | 423/448 |
| 2016/0009561 A1 | 1/2016 | Coleman et al. | |
| 2017/0081482 A1* | 3/2017 | Hanan | ..................... C08J 3/22 |

(Continued)

FOREIGN PATENT DOCUMENTS

| | | |
|---|---|---|
| CN | 1308148 A | 8/2001 |
| CN | 101671857 A | 3/2010 |

(Continued)

OTHER PUBLICATIONS

International Search Report and Written Opinion issued in PCT/CN2016/093114 with English translation of ISR, dated Nov. 1, 2016, 13 pages.
International Search Report and Written Opinion issued in PCT/CN2016/093116 with English translation of ISR, dated Oct. 19, 2016, 14 pages.
Extended European Search Report issued in EP Application 16854582.0, dated May 3, 2018, 6 pages.
Galpaya, Dilini; et al. "Recent Advances in Fabrication and Characterization of Graphene-Polymer Nanocomposites." Graphene, 2012, 1:30-49.

(Continued)

Primary Examiner — Christopher T Schatz
Assistant Examiner — Cynthia L Schaller
(74) Attorney, Agent, or Firm — Faegre Drinker Biddle & Reath LLP

(57) ABSTRACT

A polyester material including a composite having a carbon nanostructure, which comprises carbon element, from 0.5 to 4 wt % of a first non-carbon non-oxygen element substance, and from 0 to 4 wt %, of a second non-carbon non-oxygen element. The first non-carbon non-oxygen element is selected from the group consisting of P, Si, Ca, Al and Na; the second non-carbon non-oxygen element is any one selected from the group consisting of Fe, Ni, Mn, K, Mg, Cr, S or Co, or a combination of at least two selected therefrom. The G peak and D peak of the carbon element in the Raman spectrum has a peak height ratio of 1-20 in the composite having a carbon nanostructure.

18 Claims, No Drawings

(56) References Cited

U.S. PATENT DOCUMENTS

| | | | | |
|---|---|---|---|---|
| 2017/0137293 A1* | 5/2017 | Tang | ..................... | C01B 32/184 |
| 2017/0217125 A1* | 8/2017 | Li | ........................... | H01B 1/04 |

FOREIGN PATENT DOCUMENTS

| | | |
|---|---|---|
| CN | 202088605 U | 12/2011 |
| CN | 102330173 A | 1/2012 |
| CN | 102491308 A | 6/2012 |
| CN | 103044865 A | 4/2013 |
| CN | 103088460 A | 5/2013 |
| CN | 103408718 A | 11/2013 |
| CN | 103508444 A | 1/2014 |
| CN | 103642018 A | 3/2014 |
| CN | 103710790 A | 4/2014 |
| CN | 103814080 A | 5/2014 |
| CN | 103898782 A | 7/2014 |
| CN | 103938293 A | 7/2014 |
| CN | 104016341 A | 9/2014 |
| CN | 104118874 A | 10/2014 |
| CN | 104164707 A | 11/2014 |
| CN | 104328523 A | 2/2015 |
| CN | 104357941 A | 2/2015 |
| CN | 104386684 A | 3/2015 |
| CN | 104711705 A | 6/2015 |
| CN | 104755545 A | 7/2015 |
| CN | 104804204 A | 7/2015 |
| CN | 104831389 A | 8/2015 |
| CN | 104844781 A | 8/2015 |
| CN | 104892886 A | 9/2015 |
| CN | 105504199 A | 4/2016 |
| CN | 105504696 A | 4/2016 |
| CN | 105504700 A | 4/2016 |
| CN | 105504785 A | 4/2016 |
| CN | 105506771 A | 4/2016 |
| CN | 105524452 A | 4/2016 |
| CN | 105525381 A | 4/2016 |
| EP | 2921068 A1 | 9/2015 |
| JP | 2003129326 A | 5/2003 |
| JP | 2005054277 A | 3/2005 |
| JP | 2007154007 A | 6/2007 |
| JP | 2011522920 A | 8/2011 |
| JP | 2012166989 A | 9/2012 |
| JP | 2012252824 A | 12/2012 |
| JP | 2014133779 A | 7/2014 |
| JP | 2014148765 A | 8/2014 |
| JP | 2014193804 A | 10/2014 |
| JP | 2015105441 A | 6/2015 |
| WO | 2012151433 A2 | 11/2012 |
| WO | WO2014140324 A1 | 9/2014 |
| WO | WO2015076565 A1 | 5/2015 |
| WO | 2017024933 A1 | 2/2017 |
| WO | 2017071359 A1 | 5/2017 |
| WO | 2017071360 A1 | 5/2017 |
| WO | 2017084621 A1 | 5/2017 |

OTHER PUBLICATIONS

Xinhua Technology. "Shengquan Group: Bio-source Graphene Heating Intelligent Fiber," Apr. 29, 2015, no pagination, with English translation via Google.

Zhu Yu; et al. "Research Progress in Glycolide Purification," Shanghai Petrochemical Research Institute, Shanghai 201263, Oct. 15, 2015, pp. 45-46, with English translation of abstract.

\* cited by examiner

COMPOSITE POLYESTER MATERIAL, COMPOSITE POLYESTER FIBER, PROCESSES FOR PREPARING THE SAME AND USES THEREOF

CROSS-REFERENCE TO RELATED APPLICATION

This application is a national phase application of PCT Application No. PCT/CN2016/093116, internationally filed Aug. 3, 2016, which claims priority to Chinese Application 201510705758.X, filed Oct. 27, 2015; Chinese Application 201510707397.2, filed Oct. 27, 2015; Chinese Application No. 201510706656.X, filed Oct. 27, 2015, and Chinese Application 201510707240.X, filed Oct. 27, 2015, all of which are herein incorporated by reference in their entirety.

TECHNICAL FIELD

The present invention belongs to the field of high molecular weight materials, specifically relates to a composite polyester material, a composite polyester fiber, processes for preparing the same, and uses thereof. The present invention specifically relates to a composite polyester material and a composite polyester fiber compounded from a composite having a carbon nanostructure, processes for preparing the same, and uses thereof.

BACKGROUND

Polyester is a generic term of polymers obtained by polycondensation of polyols and polyacids, and primarily refers to polyethylene terephthalate (PET), traditionally also includes linear thermoplastic resins such as polybutylene terephthalate (PBT) and polyarylester. Polyester is a class of engineering plastics having excellent performances and wide-range applications, and can be made into polyester fibers and polyester films. Polyester comprises polyester resin and polyester elastomer. Polyester resin further comprises polyethylene terephthalate (PET), polybutylene terephthalate (PBT), polyarylester (PAR) and the like. Polyester elastomer (TPEE) is generally polymerized from dimethyl terephthalate, 1,4-butanediol and polybutanol; the chain segment thereof comprises hard segment part and soft segment part. Polyester elastomer is a thermoplastic elastomer.

Carbon nanomaterial refers to carbon materials in which at least one dimension of the dispersion phase dimensions is less than 100 nm, e.g. carbon nanotube, graphene and the like. Graphene is a two-dimensional material having a honeycomb structure comprised of monolayer sp2 hybrid carbon atom and has many excellent performance properties. Since the discovery in 2004, graphene has become a research focus of the scientific community. During the study of the physical and chemical properties of graphene, graphene-related composite materials emerge in endlessly at the same time. In the area of nanoscience, graphene is also used to prepare nanocomposite materials of interest, especially nanocomposite materials of graphene/metals or graphene/metal oxides. Due to excellent properties of graphene, these nanocomposite materials have promising applications in the fields of new energy sources, biosensors, catalysis, optical materials and so on.

Polyester fiber is a common name of fibers prepared by using polyesters polycondensed from many diols and aromatic dicarboxylic acids or esters thereof. Common polyester fibers generally comprise polyethylene terephthalate fibers, polybutylene terephthalate fibers, polytrimethylene terephthalate fibers, poly-1,4-cyclohexane dimethylene terephthalate fibers, poly(ethylene-2,6-naphthalate) fibers, and many modified polyethylene terephthalate fibers (e.g. CDP, ECDP, EDDP and the like).

Polyester fibers industrially produced on a large scale are made from polyethylene terephthalate (PET), which has the Chinese trade name of terylene, and is the largest variety of chemical fiber products, accounting for nearly 80% of the chemical fiber product market share. Fiber-grade polyester chips are direct raw materials for terylene fiber enterprises to process fibers to manufacture terylene staple fibers and terylene filaments, having the chemical structural formula of:

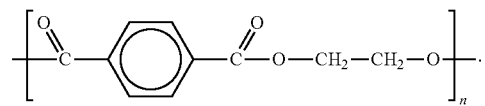

Terephthalic acid (PTA) and ethylene glycol (EG) are esterified and polycondensed to produce PET melt. PET melt is then underwater pelletized to produce PET masterbatch, and then spun.

Taking PET as an example, the industrial synthesis process of polyesters generally includes the following three main sections:

(1) Beating and mixing section of raw materials: mainly mixing raw materials homogeneously, including PTA (terephthalic acid), EG (ethylene glycol), catalyst, and other auxiliaries;

(2) Pre-polymerization section of polyesters: completing pre-polymerization of reactants and forming micromolecular polymers, wherein such section during actual productions will commonly be split into two reaction sections including primary esterification and secondary esterification, to complete removal of reaction by-products, e.g. water, and introduction of functional fillers.

(3) Polycondensation section: primarily carrying out mutual polymerization, chain extension and tackifying of macromolecular polymers, wherein such section during actual productions will commonly be split into two reaction sections including pre-polycondensation (low-vacuum polymerization) and final polycondensation (high-vacuum polymerization).

(4) Spinning section.

However, pure polyester fiber products have poor moisture absorption and easily accumulate charge to form static electricity in a dry climate. If static electricity is produced during wearing and use, comfortableness cannot be equivalent to natural cotton fiber (synthetic fibers generally have a volume resistivity of $10^{15}$ Ω·cm; to make human body feel comfortable, without discharge phenomenon, the volume resistivity of the fiber should be below $10^{10}$ Ω·cm). In addition, it is also an important direction for increasing the application value of polyester fibers to improve antibacterial property, flame retardancy, anti-dripping, and anti-UV property of polyester fibers.

Carbon nanomaterial refers to carbon materials in which at least one dimension of the dispersion phase dimensions is less than 100 nm, e.g. carbon nanotube, graphene and the like. Graphene is a two-dimensional material having a honeycomb structure comprised of monolayer sp2 hybrid carbon atom and has many excellent properties. Since the discovery in 2004, graphene has become a research focus of the scientific community. During the study of the physical and chemical properties of graphene, graphene-related composite materials emerge in endlessly at the same time. In the area of nanoscience, graphene is also used to prepare nanocomposite materials of interest, especially nanocomposite materials of graphene/metals or graphene/metal oxides. Due to the excellent properties of graphene, these nanocomposite materials have promising applications in the fields of new energy sources, biosensors, catalysis, optical materials and so on.

Common carbon nanomaterials are difficult to compound with PET due to no functional groups on the surface thereof, so as to hinder the development of preparation of high-performance materials from modified PET.

CN103938293A discloses a far-infrared polyester fiber and a process for preparing the same. The raw materials of such far-infrared polyester fiber include, according to weight part configuration, 65-85 parts of polyester chips, and 15-35 parts of far-infrared masterbatch; the raw materials of such far-infrared masterbatch include, according to weight part configuration, 75-90 parts of polyester chips, 10-20 parts of nano far-infrared powder, 0.5-5 parts of silane coupling agent, 0.5-5 parts of polyethylene wax, 0.05-1 part of tris-[2,4-di-tert-butylphenyl]-phosphite, and 0.05-1 part of pentaerythritol tetra-[β-(3,5-di-tert-butyl-4-hydroxyphenyl)-propionate].

CN1308148A discloses a far-infrared radiation hollow three-dimensional crimped polyester fiber and a process for preparing the same, comprising adding a composite inorganic far-infrared ultra-fine material having a particle size of 0.3-0.5 μm, and a titanate coupling agent and a surfactant into a high-speed mixer for dry surface treatment, mixing the surface-treated ultra-fine material powder with polyester carriers in a high-speed mixer, feeding the resultant mixed powder material to a twin screw extruder for blending extrusion, wherein the working temperature thereof is lower than the conventional preparation temperature of masterbatch by 10-30° C., feeding the far-infrared masterbatch obtained above and polyester chips to a mixer through a metering feeder, then to a screw spinning machine for producing hollow three-dimensional crimped fibers for spinning, to obtain the final product which is the far-infrared radiation hollow three-dimensional crimped polyester fiber of the present invention. The many far-infrared inorganic materials have a basic composition of a mixture of silica, alumina, titania and zirconia. Such materials are pulverized with an ultrafine airflow pulverizer to a particle size of 0.3-0.5 μm, sintering the pulverized far-infrared inorganic powder material in a high-temperature furnace at a sintering temperature of 800-1100° C., cooling and then re-pulverizing to control the particle size thereof within the range of 0.3-0.5 μm, resulting in a composite inorganic far-infrared ultra-fine material having a particle size of 0.3-0.5 μm.

SUMMARY

In order to solve the aforesaid problems, the first object of the present invention lies in providing a composite polyester material comprising a composite having a carbon nanostructure.

The composite having a carbon nanostructure comprises carbon element, from 0.5 to 4 weight percent (wt %) of a first non-carbon non-oxygen element substance, and from 0 to 4wt % of a second non-carbon non-oxygen element; the first non-carbon non-oxygen element substance is any one selected from the group consisting of simple substance and compounds of a first non-carbon non-oxygen element, or a combination of at least two selected therefrom; the first non-carbon non-oxygen element is selected from the group consisting of P, Si, Ca, Al and Na; the second non-carbon non-oxygen element exists in a form of simple substance and compounds, or a combination of at least two selected therefrom; the second non-carbon non-oxygen element is any one selected from the group consisting of Fe, Ni, Mn, K, Mg, Cr, S or Co, or a combination of at least two selected therefrom.

The G peak and D peak of the carbon element in the Raman spectrum has a peak height ratio of 1-20, e.g. 2, 5, 7, 8, 10, 12, 13, 16, 18 and the like, in the composite having a carbon nanostructure; optionally, the composite having a carbon nanostructure further has a 2D peak in the Raman spectrum.

The present invention uses a composite having a specific carbon nanostructure as a compounding raw material to compound with polyester material, wherein exemplary compounding is any one selected from the group consisting of in-situ polymerization, melt mixing and solution mixing, preferably, without any modification to the composite having a carbon nanostructure, besides simply mixing polymerization monomers of the polyester material with the composite having a carbon nanostructure, or simply mixing the polyester material with the composite having a carbon nanostructure.

The second object of the present invention is to provide a composite polyester fiber comprising a composite having a carbon nanostructure.

The composite having a carbon nanostructure comprises carbon element, from 0.5 to 4 wt % of a first non-carbon non-oxygen element substance, and from 0 to 4 wt % of a second non-carbon non-oxygen element; the first non-carbon non-oxygen element substance is any one selected from the group consisting of simple substance and compounds of a first non-carbon non-oxygen element, or a combination of at least two selected therefrom; the first non-carbon non-oxygen element is selected from the group consisting of P, Si, Ca, Al and Na; the second non-carbon non-oxygen element exists in a form of simple substance and compounds, or a combination of at least two selected therefrom; the second non-carbon non-oxygen element is any one selected from the group consisting of Fe, Ni, Mn, K, Mg, Cr, S or Co, or a combination of at least two selected therefrom.

The G peak and D peak of the carbon element in the Raman spectrum has a peak height ratio of 1-20 in the composite having a carbon nanostructure; optionally, the composite having a carbon nanostructure further has a 2D peak in the Raman spectrum.

The G peak of the carbon element in the Raman spectrum reflects the degree of sp2 hybridization; the D peak reflects the lattice imperfection, e.g. carbon structure of sp3; the 2D peak reflects the thickness of the graphene lamella.

The composite having a specific carbon nanostructure of the present invention is a carbon-based composite containing impurity elements, wherein the carbon element primarily exists in a sp2 hybrid form.

The present invention uses a composite having a specific carbon nanostructure as a compounding raw material to compound with polyester material, without any modification to the composite having a carbon nanostructure in advance, besides simply adding the composite having a carbon nanostructure into the current polymerization process of polyester fibers.

The polyester material of the present invention contains graphene. The graphene is introduced in a form of a composite having a carbon nanostructure. The composite having a carbon nanostructure contains graphene, and carbon having sp3 hybrid structure.

The polyester fiber of the present invention contains graphene. The graphene is introduced in a form of a composite having a carbon nanostructure. The composite having a carbon nanostructure contains graphene, and carbon having sp3 hybrid structure.

The composite having a carbon nanostructure has a far-infrared detection normal emissivity of greater than 0.85, e.g. 0.87, 0.89, 0.91, 0.92, 0.93 and the like. Preferably, the composite having a carbon nanostructure has a far-infrared detection normal emissivity of greater than 0.88.

The composite having a carbon nanostructure comprises 80 wt % or more of the carbon element, e.g. 82 wt %, 86wt %, 89 wt %, 91 wt %, 94 wt %, 97 wt %, 99 wt % and the like, preferably 85-97 wt %, further preferably 90-95 wt %.

Preferably, the G peak and D peak of the carbon element in the Raman spectrum has a peak height ratio of 2-20, preferably 3-20, in the composite having a carbon nanostructure.

Preferably, the composite having a carbon nanostructure has a carbon six-membered ring honeycomb lamellar structure having a thickness of 100 nm or less, preferably of 20 nm or less, further preferably is any one selected from the group consisting of carbon six-membered ring honeycomb lamellar structures having 1-10 layers, or a combination of at least two selected therefrom, preferably any one of structures having single layer, double layers, and 3-10 layers, or a combination of at least two selected therefrom.

Carbon six-membered ring honeycomb lamellar structures having more than 10 layers, and having a thickness of 100 nm or less are called graphene nanosheets. Carbon six-membered ring honeycomb lamellar structures prepared by using biomass as carbon source, having more than 10 layers, and having a thickness of 100 nm or less are called biomass graphene nanosheets. Carbon six-membered ring honeycomb lamellar structures having 1-10 layers are called graphene. Carbon six-membered ring honeycomb lamellar structures prepared by using biomass as carbon source and having 1-10 layers are called biomass graphene.

Preferably, the carbon six-membered ring honeycomb lamellar structure in the composite microscopically shows any one conformation selected from the group consisting of warping, curling and folding, or a combination of at least two selected therefrom.

The microstructure of the lamellar structure in the composite typically can be observed via electron microscope which may be transmission electron microscope or scanning electron microscope.

Preferably, the first non-carbon non-oxygen element in the composite having a carbon nanostructure is adsorbed on the surface of or inside the carbon nanostructure in any one form selected from the group consisting of simple substance, oxides and carbides, or a combination of at least two selected therefrom.

Preferably, the first non-carbon non-oxygen element in the composite having a carbon nanostructure is introduced through carbon sources preferably selected from biomass carbon sources, which are any one selected from the group consisting of plants and/or agricultural and forestry wastes, or a combination of at least two selected therefrom, preferably any one selected from coniferous wood, broadleaf wood, forest wood, agricultural and forestry wastes, or a combination of at least two selected therefrom, wherein the agricultural and forestry wastes are any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs. Preferably, the composite having a carbon nanostructure in the composite polyester material has an amount of 0.1-10 wt %, e.g. 0.2 wt %, 1 wt %, 3 wt %, 4 wt %, 6 wt %, 8 wt %, 9 wt % and the like, preferably 0.5-7 wt %, further preferably 1-5 wt %, specifically preferably 2-4 wt %.

Preferably, the composite having a carbon nanostructure has a far-infrared detection normal emissivity of greater than 0.88.

The present invention makes no specific limits to the type of polyesters. The typical, but not limiting, polyesters comprise polyethylene terephthalate, polybutylene terephthalate, polypropylene terephthalate, poly-1,4-cyclohexane dimethylene terephthalate, poly(ethylene-2,6-naphthalate), and many modified polyethylene terephthalates (e.g. CDP, ECDP, EDDP and the like). Any polyester which those skilled in the art can obtain can be used in the present invention. The present invention preferably uses PET polyesters of industrial mass production.

The third object of the present invention is to provide a first process for preparing the composite polyester material as stated in the first object, comprising: melting a polyester material in a solvent, then adding a composite having a carbon nanostructure, cooling to obtain the composite polyester material as stated in the first object. Preferably, the composite having a carbon nanostructure needs no modification.

Preferably, the composite having a carbon nanostructure is added in an amount of 0.1-10 wt %, e.g. 0.2 wt %, 1 wt %, 3 wt %, 4 wt %, 6wt %, 8 wt %, 9 wt % and the like, preferably 0.5-7 wt %, further preferably 1-5 wt %, especially preferably 2-4 wt % of the polyester material.

The fourth object of the present invention is to provide a second process for preparing the composite polyester material as stated in the first object, comprising: dissolving a polyester material in a solvent, then adding a composite having a carbon nanostructure, removing the solvent to obtain the composite polyester material as stated in the first object. Preferably, the composite having a carbon nanostructure needs no modification.

Preferably, the composite having a carbon nanostructure is added in an amount of 0.1-10 wt %, e.g. 0.2 wt %, 1 wt %, 3 wt %, 4 wt %, 6 wt %, 8 wt %, 9 wt % and the like, preferably 0.5-7 wt %, further preferably 1-5 wt %, especially preferably 2-4 wt % of the polyester material.

Preferably, the solvent is any one selected from the group consisting of fluoroacetic acid, a mixed solution of phenol and tetrachloroethane, and tetrahydrofuran, or a combination of at least two selected therefrom. The typical but not limitative combinations comprise a combination of fluoroacetic acid and phenol, a combination of a mixed solution of phenol and tetrachloroethane and tetrahydrofuran, a combination of fluoroacetic acid and tetrahydrofuran.

Preferably, the solvent is removed by distillation.

The fifth object of the present invention is to provide a third process for preparing the composite polyester materials as stated in the first object, comprising the following steps:

during the polymerization of a polyester material, a composite having a carbon nanostructure is introduced for in-situ compounding, to obtain a melt after reaction; the melt is discharged to obtain the composite polyester material as stated in the first object. Preferably, the composite having a carbon nanostructure needs no modification.

Preferably, the composite having a carbon nanostructure is added in an amount of 0.1-10 wt %, e.g. 0.2 wt %, 1 wt %, 3 wt %, 4 wt %, 6 wt %, 8 wt %, 9 wt % and the like of the polyester material.

Preferably, the composite having a carbon nanostructure is added in a dry powder form of the composite having a carbon nanostructure, or a dispersion liquid form of the composite having a carbon nanostructure.

Preferably, the dispersant of the dispersion liquid of the composite having a carbon nanostructure is any one selected from the group consisting of deionized water, distilled water, ethanol, ethylene glycol, terephthalic acid, sodium acetate solution, dodecylbenzene sulfonic acid, and castor oil polyoxyethylene ether, or a combination of at least two selected therefrom.

Preferably, the composite having a carbon nanostructure is introduced at any one timing selected from the group consisting of beating stage of raw materials, esterification pre-polymerization stage, pre-polycondensation stage, and final polycondensation stage, or a combination of at least two selected therefrom, preferably beating stage of raw materials.

Preferably, the melt is discharged under the conditions of cooling water at 20-75° C. and a drawing speed of 0.01-1 m/s.

As a preferred technical solution of the fifth object, the process for preparing the composite polyester material of the present invention comprises the following steps:

(1) beating and homogeneously mixing a polyacid, a polyalcohol and a composite having a carbon nanostructure, feeding into a reaction kettle, and then passing through esterification pre-polymerization stage, pre-polycondensation stage, and final polycondensation stage to complete polymerization, so as to obtain a melt;

(2) discharging the melt under the conditions of cooling water at 20-75° C. and a drawing speed of 0.01-1 m/s, directly pelletizing to obtain the composite polyester material as stated in the first object.

In the process for preparing the composite polyester materials provided in the third, fourth and fifth of the present invention, the composite having a carbon nanostructure is obtained by the following procedures:

(i) mixing a biomass carbon source with a catalyst, stirring for catalytic treatment, drying to obtain a precursor;

(ii) maintaining the temperature of the precursor at 280-350° C., e.g. 282° C., 288° C., 295° C., 300° C., 332° C., 340° C. and the like, for 1.5-2.5 hours (h), e.g. 1.6 h, 1.8 h, 2 h, 2.2 h, 2.4 h and the like under protective atmosphere, then increasing by temperature programming to 950-1050° C., e.g. 960° C., 970° C., 980° C., 990° C., 1010° C., 1020° C., 1030° C., 1040° C. and the like at a rate of 15-20° C./minutes (min), e.g. 16° C./min, 18° C./min, 19° C./min and the like, maintaining the temperature for 3-4 h, e.g. 3.1 h, 3.3 h, 3.5 h, 3.8 h, 3.9 h and the like to obtain a crude product;

(iii) washing the crude product to obtain the composite having a carbon nanostructure;

Preferably, the biomass carbon source and the catalyst have a mass ratio of 1:(0.1-10), e.g. 1:2, 1:4, 1:6, 1:8 and the like, preferably 1:(0.5-5), further preferably 1:(1-3);

Preferably, the catalyst is any one selected from the group consisting of manganese compounds, iron-containing compounds, cobalt-containing compounds and nickel-containing compounds, or a combination of at least two selected therefrom, wherein the iron-containing compounds are any one selected from the group consisting of iron halogen compounds, iron cyanides and iron-containing salts of acid, or a combination of at least two selected therefrom; the cobalt-containing compounds are any one selected from the group consisting of cobalt halogen compounds and cobalt-containing salts of acid, or a combination of at least two selected therefrom; and the nickel-containing compounds are any one selected from the group consisting of nickel chlorides and nickel-containing salts of acid, or a combination of at least two selected therefrom.

Further preferably, the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

The typical, but not limitative examples of the catalyst of the present invention comprise a combination of ferrous chloride and ferric sulfate, a combination of potassium ferricyanide and potassium trioxalatoferrate, a combination of cobalt chloride, cobalt nitrate and ferric chloride, a combination of cobalt sulfate, cobalt acetate and nickel nitrate, a combination of ferric chloride, cobalt chloride and nickel acetate.

Preferably, the stirring for catalytic treatment in step (i) is carried out at a temperature of 150-200° C., e.g. 160° C., 170° C., 180° C., 190° C. and the like, for 4 h or more, e.g. 4.2 h, 7 h, 9 h, 12 h, 16 h, 19 h, 23 h and the like, preferably 4-14 h; the water content in the precursor is preferably 10 wt % or less, e.g. 1 wt %, 2 wt %, 3 wt %, 4 wt %, 5 wt %, 6 wt %, 7 wt %, 8 wt %, 1 wt % and the like. The temperature rising rate in step (ii) increasing the temperature of the precursor to 280-350° C. is preferably 3-5° C./min, e.g. 3.5° C./min, 3.8° C./min, 4.2° C./min, 4.5° C./min, 4.8° C./min and the like; the protective atmosphere is any one selected from the group consisting of nitrogen, helium and argon, or a combination of at least two selected therefrom, preferably nitrogen; the washing the crude product in step (iii) refers to acid washing and water washing in sequence, wherein the acid washing is preferably carried out by using hydrochloric acid having a concentration of 3-6 wt %, further preferably 5 wt %; the water washing is preferably carried out by using deionized water and/or distilled water; the washing is carried out at a temperature of 55-65° C., e.g. 56° C., 57° C., 58° C., 60° C., 63° C. and the like, preferably 60° C.

Preferably, the biomass carbon source is cellulose and/or lignin, preferably cellulose, further preferably porous cellulose.

The porous cellulose of the present invention can be obtained according to the prior art. The typical, but not limitative prior art for obtaining porous celluloses includes, e.g. the process for preparing porous cellulose disclosed in CN104016341A and the process for preparing cellulose disclosed in CN103898782A.

Preferably, the porous cellulose is obtained by the following procedures of: acid hydrolyzing a biomass source to obtain lignocellulose, and then porous post-processing to obtain porous cellulose; optionally, the porous cellulose is used after bleaching; the biomass carbon source is preferably any one selected from plants and/or agricultural and forestry wastes, or a combination of at least two selected therefrom, preferably any one selected from agricultural and forestry wastes, or a combination of at least two selected therefrom; the agricultural and forestry wastes are preferably any one selected from the group consisting of corn stalks, corn cobs, sorghum stalks, beet residues, bagasse, furfural residues, xylose residues, wood chips, cotton stalks, husks, and reeds, or a combination of at least two selected therefrom, preferably corn cobs.

The typical, but not limitative combinations of the biomass source of the present invention comprise a combination of corn stalks and corn cobs, a combination of bagasse, sorghum stalks and wood chips, a combination of beet residues, bagasse and corn cobs, a combination of sorghum stalks, beet residues and xylose residues.

The sixth object of the present invention is to provide a process for preparing the composite polyester fiber as stated in the second object, comprising: dicing the composite polyester material obtained in the fifth object to obtain a composite polyester masterbatch, melt-spinning the composite polyester masterbatch to obtain the polyester fiber compounded from the composite having a carbon nanostructure.

The melt-spinning is a pre-oriented yarn process.

Preferably, the pre-oriented yarn has a yarn extruding temperature of 30-70° C. and a yarn extruding humidity of 10-90%, preferably a yarn extruding temperature of 55-65° C. and a yarn extruding humidity of 40-50%, further preferably a yarn extruding temperature of 62° C. and a yarn extruding humidity of 42%.

Preferably, the yarn extruding is carried out by air cooling or water cooling.

Preferably, the melt is discharged under the condition of cooling water at a temperature of 20-75° C., preferably 40° C.

Preferably, the melt is discharged at a drawing speed of 0.01-1 m/s.

As a preferred technical solution of the sixth object, the process for preparing the composite polyester fiber comprises the following steps:
(1) beating and homogeneously mixing a polyacid, a polyalcohol and a composite having a carbon nanostructure, feeding into a reaction kettle, esterifying and polycondensing to complete polymerization under the action of a catalyst, to obtain a melt;
(2) discharging the melt under the conditions of cooling water at 20-75° C. and a drawing speed of 0.01-1 m/s, directly pelletizing to obtain a masterbatch;
(3) melt-spinning the masterbatch at a yarn extruding temperature of 30-70° C. and a yarn extruding humidity of 10-90% by air cooling or water cooling, to obtain a polyester fiber compounded from the composite having a carbon nanostructure.

The seventh object of the present invention is to provide uses of the composite polyester material stated in the first object. The composite polyester material is used to prepare polyester fibers by melt-spinning, and to prepare polyester films by cast coating method, and to prepare tubes, furniture and sectional materials. Further uses of the aforesaid composite polyester material are included, but not limited to, as long as the polyester products obtained by using the composite polyester material and masterbatch thereof and by reprocessing all fall within the protection scope of the present invention.

The eighth object of the present invention is to provide uses of the composite polyester fiber stated in the second object. The composite polyester fiber is used for preparing, including but not limited to, civilian clothing, home textiles, UV protective fabrics and industrial special protective clothing. Those will fall within the protection scope of the present invention as long as they are the textiles in any form, fabrics or products in other forms obtained by reprocessing the composite polyester fiber according to the principles of the present invention.

As compared to the prior art, the present invention has the following beneficial effects.
(1) The present invention uses a composite having a specific carbon nanostructure to compound polyester materials, obtaining more excellent antibacterial property and low-temperature far-infrared performance, wherein the far-infrared detection normal emissivity is of greater than 0.85.
(2) The process for preparing the polyester material compounded from the composite having a carbon nanostructure is simple; the composite having a carbon nanostructure does not need to be modified; the melt of the composite polyester material obtained by polymerization can be directly discharged without any after-treatment, and the process is simple.
(3) The process for preparing the polyester fiber compounded from the composite having a carbon nanostructure does not need to modify the composite having a carbon nanostructure, and retains intrinsic good properties of the composite having a carbon nanostructure, lowering the cost and simplifying the technological process. Moreover, the current polyester synthesizing and spinning equipment can be directly applied for preparation, which realizes seamless joint of the compounding technology of polyesters compounded from the composite having a carbon nanostructure and the conventional preparation technology of polyester masterbatch and spinning process, and is easy to industrial promotion.
(4) Without any after-treatment, the polyester fiber compounded from the composite having a carbon nanostructure of the present invention can achieve many excellent performances as expected, e.g. the far-infrared detection normal emissivity being greater than 0.85, and having better antibacterial effect.

DESCRIPTION

The technical solution of the present invention is further stated by the following embodiments.

Those skilled in the art shall know that the examples are only used to understand the present invention, and shall not be regarded any specific limits to the present invention.

Preparation of a composite having a carbon nanostructure:
(1) Preparing porous cellulose by reference to the indexes in CN104016341A, specifically:
   Adjusting with sulfuric acid at 90° C. an aqueous solution of corn cob to pH=3, soaking for 10 min for hydrolysis to obtain lignocellulose, wherein the sulfuric acid has a mass of 3% of the corn cob mass; and then soaking at 70° C. the resultant lignocellulose in acid sulphite for 1 h to obtain porous cellulose for backup, wherein the acid is sulfuric acid; the sulphite is magnesium sulfite; the sulfuric acid has a mass of 4% of the lignocellulose mass; the liquid-solid ratio is 2:1;
(2) Preparing a composite having a carbon nanostructure, specifically:
Mixing the porous cellulose with a catalyst in a mass ratio of 1:(0.1-10), stirring at 150-200° C. for catalytic treatment for more than 4 h, drying to obtain a precursor with a water content of 10 wt % or less; then heating the precursor under protective atmosphere to 280-350° C. at a rate of 3-5° C./min, maintaining the temperature for 1.5-2.5 h, then heating by temperature programming to 950-1200° C. at a rate of 15-20° C./min, maintaining the temperature for 3-4 h to obtain a crude product; acid-washing the crude product at 55-65° C. with hydrochloric acid having a concentration of 3-6wt % to obtain a composite having a carbon nanostructure.

The composite having a carbon nanostructure 1# was prepared under the following conditions:
in step (2), the catalyst was ferrous chloride; the porous cellulose and the catalyst were mixed in a mass ratio of 1:0.1; the catalytic treatment was carried out at 150° C. for 4 h; the precursor had a water content of 10 wt %;
the crude product was obtained by the following procedures of increasing the temperature at a rate of 3° C./min to 280° C., maintaining for 2 h, then heating at a rate of 15° C./min to 950° C., and maintaining for 3 h;
the acid-washing was carried out at 55° C.; hydrochloric acid used for the acid-washing had a concentration of 4 wt %.

The composite having a carbon nanostructure 1# primarily contains elements of P, Si, Ca, Al, Na, Fe, Mg; Raman spectrum shows that the peak height ratio of G peak and D peak is 7, and there is a 2D peak.

The preparation process of the composite having a carbon nanostructure 2# is different from that of the composite having a carbon nanostructure 1# in that the ratio of the porous cellulose to ferrous chloride in step (2) was changed to 1:10; the resultant composite having a carbon nanostructure 2# primarily contains elements of P, Si, Ca, Al, Na, Fe, Mg; and Raman spectrum shows that the peak height ratio of G peak and D peak is 20.

The preparation process of the composite having a carbon nanostructure 3# is different from that of the composite having a carbon nanostructure 1# in that the ratio of the porous cellulose to ferrous chloride in step (2) was changed to 1:0.5; the resultant composite having a carbon nanostructure 3# primarily contains elements of P, Si, Ca, Al, Na, Fe, Mg; and Raman spectrum shows that the peak height ratio of G peak and D peak is 1.5.

EXAMPLE 1

A composite polyester material was obtained by the following process:
(1) 100 g of a composite having a carbon nanostructure was homogeneously mixed with 8.52 kg of PTA and 3.5L of ethylene glycol, treated by ball milling for 20 min, directly introduced to a beating kettle and beaten for 30 min, reacted according to the three-kettle PET polymerization process and polymerized to obtain a melt;
(2) discharging the melt under the conditions of cooling water at 40° C. and a drawing speed of 0.5 m/s, directly pelletizing to obtain a PET material (PET masterbatch) compounded from the composite having a carbon nanostructure;

After step (2), the PET masterbatch compounded from the composite having a carbon nanostructure was drum-dried at 110° C. for 24 h, and directly used for melt-spinning in step (3). The yarn was cooled with water mist at 40° C., dried at 35° C., melt-spun to obtain a composite polyester fiber.

The composites having a carbon nanostructure 1#, 2# and 3# were respectively used for preparing polyester materials and polyester fibers. The polyester materials were respectively labelled as product 1a (the PET material compounded from 1#), product 1b (the PET material compounded from 2#), product 1c (the PET material compounded from 3#); polyester fibers were respectively labelled as product 1a' (the polyester fiber compounded from 1#), product 1b' (the polyester fiber compounded from 2#) and product 1c' (the polyester fiber compounded from 3#).

The products 1a and 1a' had a far-infrared detection normal emissivity of as high as 0.87, and an antibacterial rate on *Staphylococcus aureus* of 70%. The products 1b and 1b' had a far-infrared detection normal emissivity of as high as 0.89, and an antibacterial rate on *Staphylococcus aureus* of 82%. The products 1c and 1c' had a far-infrared detection normal emissivity of as high as 0.85, and an antibacterial rate on *Staphylococcus aureus* of 60%.

Infrared detection data were based on GBT 7286.1-1987 Test method for total normal emittance of metals and non-metallic materials.

Antibacterial test data were based on GB/T 31402-2015 Plastics-Measurement of antibacterial activity on plastics surfaces, taking *Staphylococcus aureus* as examples.

EXAMPLE 2

A composite polyester material was obtained by the following process:
(1) 200 g of a composite having a carbon nanostructure was homogeneously mixed with 8.52 kg of PTA and 3.5L of ethylene glycol, treated by ball milling for 20 min, directly introduced to a beating kettle and beaten for 30 min, reacted according to the three-kettle PET polymerization process and polymerized to obtain a melt;
(2) discharging the melt under the conditions of cooling water at 40° C. and a drawing speed of 0.5 m/s, directly pelletizing to obtain a PET material (PET masterbatch) compounded from the composite having a carbon nanostructure;

After step (2), the PET masterbatch compounded from the composite having a carbon nanostructure was drum-dried at 110° C. for 24 h, and directly used for melt-spinning in step (3). The yarn was cooled with water mist at 40° C., dried at 35° C., melt-spun to obtain a composite polyester fiber.

The composites having a carbon nanostructure 1#, 2#, and 3# were respectively used for preparing polyester materials and polyester fibers. The polyester materials were respectively labelled as product 2a (the PET material compounded from 1#), product 2b (the PET material compounded from 2#), product 2c (the PET material compounded from 3#); polyester fibers were respectively labelled as product 2a' (the polyester fiber compounded from 1#), product 2b' (the polyester fiber compounded from 2#) and product 2c' (the polyester fiber compounded from 3#).

The products 2a and 2a' had a far-infrared detection normal emissivity of as high as 0.90, and an antibacterial rate on *Staphylococcus aureus* of 95%. The products 2b and 2b' had a far-infrared detection normal emissivity of as high as 0.92, and an antibacterial rate on *Staphylococcus aureus* of 97%. The products 2c and 2c' had a far-infrared detection normal emissivity of as high as 0.88, and an antibacterial rate on *Staphylococcus aureus* of 90%.

The test methods were the same as those in Example 1.

EXAMPLE 3

A composite polyester material was obtained by the following process:
(1) 8.52 kg of PTA, 3.5L of EG and 3.8 g of a catalyst ethylene glycol antimony were beaten for 30 min, reacted according to the three-kettle PET polymerization process and polymerized to obtain a melt;

(2) dissolving the melt in trifluoroacetic acid, adding 200 g of a composite having a carbon nanostructure and grinding for 10 min, and homogeneously dispersing; discharging under the conditions of cooling water at 40° C. and a drawing speed of 0.5 m/s, directly pelletizing to obtain a PET material (PET masterbatch) compounded from the composite having a carbon nanostructure.

After step (2), the PET masterbatch compounded from the composite having a carbon nanostructure was drum-dried at 110° C. for 24 h, and directly used for melt-spinning in step (3). The yarn was cooled with water mist at 40° C., dried at 35° C., melt-spun to obtain a composite polyester fiber.

The composites having a carbon nanostructure 1#, 2#, and 3# were respectively used for preparing polyester materials and polyester fibers. The polyester materials were respectively labelled as product 3a (the PET material compounded from 1#), product 3b (the PET material compounded from 2#), product 3c (the PET material compounded from 3#); polyester fibers were respectively labelled as product 3a' (the polyester fiber compounded from 1#), product 3b' (the polyester fiber compounded from 2#) and product 3c' (the polyester fiber compounded from 3#).

The products 3a and 3a' had a far-infrared detection normal emissivity of as high as 0.89, and an antibacterial rate on *Staphylococcus aureus* of 90%. The products 3b and 3b' had a far-infrared detection normal emissivity of as high as 0.90, and an antibacterial rate on *Staphylococcus aureus* of 95%. The products 3c and 3c' had a far-infrared detection normal emissivity of as high as 0.87, and an antibacterial rate on *Staphylococcus aureus* of 88%.

The test methods were the same as those in Example 1.

EXAMPLE 4

A composite polyester material was obtained by the following process:

(1) 600 ml of ethylene glycol was introduced to a beating kettle containing 8.52 kg of PTA and 3L of ethylene glycol, beaten for 30 min after an addition of 3.8 g of ethylene glycol antimony, reacted according to the three-kettle PET polymerization process and polymerized to obtain a melt; excessive EG should be removed during the secondary esterification and polycondensation of the polymerization;

(2) heating and melting the melt, adding 300 g of a composite having a nanostructure and grinding for 10 min;

discharging the melt under the conditions of cooling water at 40° C. and a drawings speed of 0.5 m/s, directly pelletizing to obtain a PET material (PET masterbatch) compounded from the composite having a carbon nanostructure;

After step (2), the PET masterbatch compounded from the composite having a carbon nanostructure was drum-dried at 110° C. for 24 h, and directly used for melt-spinning in step (3). The yarn was cooled with water mist at 40° C., dried at 35° C., melt-spun to obtain a composite polyester fiber.

The composites having a carbon nanostructure 1#, 2#, and 3# were respectively used for preparing polyester materials and polyester fibers. The polyester materials were respectively labelled as product 4a (the PET material compounded from 1#), product 4b (the PET material compounded from 2#), product 4c (the PET material compounded from 3#); polyester fibers were respectively labelled as product 4a' (the polyester fiber compounded from 1#), product 4b' (the polyester fiber compounded from 2#) and product 4c' (the polyester fiber compounded from 3#).

The products 4a and 4a' had a far-infrared detection normal emissivity of as high as 0.91, and an antibacterial rate on *Staphylococcus aureus* of 99%. The products 4b and 4b' had a far-infrared detection normal emissivity of as high as 0.93, and an antibacterial rate on *Staphylococcus aureus* of 99%. The products 4c and 4c' had a far-infrared detection normal emissivity of as high as 0.89, and an antibacterial rate on *Staphylococcus aureus* of 93%.

The test methods were the same as those in Example 1.

EXAMPLE 5

A composite polyester material was obtained by the following process:

(1) 8.52 kg of PTA and 3.5L of ethylene glycol are weighed in a beating kettle; 3.8 g of ethylene glycol antimony was added and beaten for 30 min, primarily esterified under the conditions of the three-kettle PET polymerization for 40 min, poured to an secondary esterification kettle; a composite having a carbon nanostructure/ethylene glycol slurry having been ball-milled for 20 min (100 g of the composite having a carbon nanostructure/200 mL of ethylene glycol) was introduced to the secondary esterification kettle for subsequent polymerization to obtain a melt; excessive EG should be removed during the secondary esterification and polycondensation of the polymerization;

(2) discharging the melt under the conditions of cooling water at 40° C. and a drawings speed of 0.5 m/s, directly pelletizing to obtain a PET material (PET masterbatch) compounded from the composite having a carbon nanostructure;

The composites having a carbon nanostructure 1#, 2#, and 3# were respectively used for preparing polyester materials and polyester fibers. The polyester materials were respectively labelled as product 5a (the PET material compounded from 1#), product 5b (the PET material compounded from 2#), product 5c (the PET material compounded from 3#); polyester fibers were respectively labelled as product 5a' (the polyester fiber compounded from 1#), product 5b' (the polyester fiber compounded from 2#) and product 5c' (the polyester fiber compounded from 3#).

The products 5a and 5a' had a far-infrared detection normal emissivity of as high as 0.87, and an antibacterial rate on *Staphylococcus aureus* of 68%. The products 5b and 5b' had a far-infrared detection normal emissivity of as high as 0.88, and an antibacterial rate on *Staphylococcus aureus* of 75%. The products 5c and 5c' had a far-infrared detection normal emissivity of as high as 0.85, and an antibacterial rate on *Staphylococcus aureus* of 60%.

The test methods were the same as those in Example 1.

EXAMPLE 6

The difference from Example 1 lies in adding 500 g of the composite having a carbon nanostructure.

The composite having a carbon nanostructure 1# was used for preparing polyester material, which was labelled as product 6a (the PET material compounded from 1#); the composite having a carbon nanostructure 1# was used for preparing polyester fiber, which was labelled as product 6a' (the polyester fiber compounded from 1#).

The product 6a had a far-infrared detection normal emissivity of as high as 0.92, and an antibacterial rate on *Staphylococcus aureus* of 99%.

The product 6a' had a far-infrared detection normal emissivity of as high as 0.92, and an antibacterial rate on *Staphylococcus aureus* of 99%.

The test methods were the same as those in Example 1.

EXAMPLE 7

The difference from Example 1 lies in adding 1000 g of the composite having a carbon nanostructure.

The composite having a carbon nanostructure 1# was used for preparing polyester material, which was labelled as product 7a (the PET material compounded from 1#); the composite having a carbon nanostructure 1# was used for preparing polyester fiber, which was labelled as product 7a' (the polyester fiber compounded from 1#).

The product 7a had a far-infrared detection normal emissivity of as high as 0.93, and an antibacterial rate on *Staphylococcus aureus* of 99%.

The product 7a' had a far-infrared detection normal emissivity of as high as 0.93, and an antibacterial rate on *Staphylococcus aureus* of 99%.

The test methods were the same as those in Example 1.

EXAMPLE 8

The difference from Example 1 lies in adding 1200 g of the composite having a carbon nanostructure.

The composite having a carbon nanostructure 1# was used for preparing polyester material, which was labelled as product 8a (the PET material compounded from 1#); the composite having a carbon nanostructure 1# was used for preparing polyester fiber, which was labelled as product 8a' (the polyester fiber compounded from 1#).

The product 8a had a far-infrared detection normal emissivity of as high as 0.93, and an antibacterial rate on *Staphylococcus aureus* of 99%.

The product 8a' had a far-infrared detection normal emissivity of as high as 0.93, and an antibacterial rate on *Staphylococcus aureus* of 99%.

The test methods were the same as those in Example 1.

Comparison Example 1

The difference from Example 1 merely lies in adding no composite having a carbon nanostructure during the polyester polymerization.

The polyester material prepared in Comparison Example 1 had a far-infrared detection normal emissivity of as high as 0.76, and an antibacterial rate on *Staphylococcus aureus* of 0%.

The polyester fiber prepared in Comparison Example 1 had a far-infrared detection normal emissivity of as high as 0.76, and an antibacterial rate on *Staphylococcus aureus* of 0%.

The test methods were the same as those in Example 1.

Comparison Example 2

The difference from Example 1 lies in adding 1400 g of the composite having a carbon nanostructure.

The polyester material prepared from the composite having a carbon nanostructure 1# in Comparison Example 2 had a far-infrared detection normal emissivity of as high as 0.83, and an antibacterial rate on *Staphylococcus aureus* of 80%.

The polyester fiber prepared from the composite having a carbon nanostructure 1# in Comparison Example 2 had a far-infrared detection normal emissivity of as high as 0.83, and an antibacterial rate on *Staphylococcus aureus* of 80%.

The test methods were the same as those in Example 1.

Comparison Example 3

The specific conditions of a process for preparing a composite polyurethane foam differs from those in Example 1 in replacing the composite having a carbon nanostructure prepared in the example with commercially available graphene, mixing with 1 g of phosphorus pentoxide, 1 g of silicon dioxide powder, 1 g of calcium chloride, 1 g of aluminium oxide, 1 g of sodium carbonate, 1 g of magnesium chloride and 1 g of ferrous chloride and adding into polyether glycol, introducing elements of P, Si, Ca, Al, Na, Fe, Mg, wherein Raman spectrum showed a peak height ratio of the G peak and D peak of 6.8.

The polyester material prepared in Comparison Example 3 had a far-infrared detection normal emissivity of as high as 0.87, and an antibacterial rate on *Staphylococcus aureus* of 88%.

The polyester fiber prepared in Comparison Example 3 had a far-infrared detection normal emissivity of as high as 0.87, and an antibacterial rate on *Staphylococcus aureus* of 88%.

The test methods were the same as those in Example 1.

The applicant declares that the present application discloses the process of the present invention via the aforesaid examples. However, the present invention is not limited by the aforesaid process steps. That is to say, it does not mean that the present invention cannot be carried out unless the aforesaid process steps are carried out. Those skilled in the art shall know that any improvement, equivalent replacement of the parts of the present invention, addition of auxiliary parts, selection of specific modes and the like all fall within the protection scope and disclosure of the present invention.

The invention claimed is:
1. A composite polyester material comprising:
   a composite having a carbon nanostructure comprising:
      carbon element;
      a first non-carbon non-oxygen element substance from 0.5 to 4 wt% of the composite having the carbon nanostructure, the first non-carbon non-oxygen element substance consisting essentially of P, Si, Ca, Al and Na; and
      a second non-carbon non-oxygen element from 0 to 4 wt% of the composite having the carbon nanostructure, the second non-carbon non-oxygen element is any one selected from the group consisting of Fe, Ni, Mn, K, Mg, Cr, S or Co, or a combination of at least two selected therefrom;
      wherein the G peak and D peak of the carbon element in the Raman spectrum has a D peak to G peak height ratio of 1-20 in the composite having the carbon nanostructure, and optionally, the composite having the carbon nanostructure further has a 2D peak in the Raman spectrum;
      wherein the composite having the carbon nanostructure is present in the composite polyester material in an amount of 0.1-10 wt%.
2. The composite polyester material of claim 1, wherein the composite having the carbon nanostructure has a far-infrared detection normal emissivity of greater than 0.85; and the composite having the carbon nanostructure comprises 80 wt% or more of the carbon element.

3. The composite polyester material of claim 1, wherein:
the composite having the carbon nanostructure has a carbon six-membered ring honeycomb lamellar structure having a thickness of 100 nm or less, the carbon six-membered ring honeycomb lamellar structure microscopically showing any one conformation selected from the group consisting of warping, curling and folding, or a combination of at least two selected therefrom;
the first non-carbon non-oxygen element in the composite having the carbon nanostructure is adsorbed on the surface of or inside the carbon nanostructure in any one form selected from the group consisting of simple substance, oxides and carbides, or a combination of at least two selected therefrom; and
the first non-carbon non-oxygen element in the composite having the carbon nanostructure is introduced through biomass carbon sources.

4. A process for preparing the composite polyester material of claim 1, the process comprising any one of:
i) melting a polyester material, then adding a composite having the carbon nanostructure, cooling to obtain the composite polyester material;
ii) dissolving a polyester material in a solvent, then adding a composite having the carbon nanostructure, and removing the solvent to obtain the composite polyester material; or
iii) during the polymerization of a polyester material, a composite having the carbon nanostructure is introduced for in-situ compounding, to obtain a melt after reaction, and the melt is discharged to obtain the composite polyester material;
wherein the composite having the carbon nanostructure is added in an amount of from 0.1 to 10 wt% of the polyester material.

5. The process of claim 4, wherein the solvent in process ii) is any one selected from the group consisting of fluoroacetic acid, a mixed solution of phenol and tetrachloroethane, and tetrahydrofuran, or a combination of at least two selected therefrom.

6. The process of claim 4, wherein the composite having the carbon nanostructure in process iii) is added in a dry powder form of the composite having the carbon nanostructure, or a dispersion liquid form of the composite having the carbon nanostructure.

7. The process of claim 4, wherein the composite having the carbon nanostructure in process iii) is introduced at any one timing selected from the group consisting of a beating stage of raw materials, an esterification pre-polymerization stage, a pre-polycondensation stage, and a final polycondensation stage, or a combination of at least two selected therefrom; and the melt is discharged under the conditions of cooling water at 20-75° C. and a drawing speed of 0.01-1 m/s.

8. The process of claim 4, wherein the process iii) further comprises:
(1) beating and homogeneously mixing a polyacid, a polyalcohol and the composite having the carbon nanostructure, feeding into a reaction kettle, and then passing through an esterification pre-polymerization stage, a pre-polycondensation stage, and a final polycondensation stage to complete polymerization, so as to obtain a melt; and
(2) discharging the melt under the conditions of cooling water at 20-75° C. and a drawing speed of 0.01-1 m/s, and directly pelletizing to obtain the composite polyester material.

9. The process of claim 4, wherein the composite having the carbon nanostructure is obtained by:
(i) mixing a biomass carbon source with a catalyst, stirring for catalytic treatment, and drying to obtain a precursor;
(ii) maintaining the temperature of the precursor at 280-350° C. for 1.5-2.5h under protective atmosphere, then increasing by temperature programming to 950-1200° C. at a rate of 15-20° C/min, maintaining the temperature for 3-4h to obtain a crude product; and
(iii) washing the crude product to obtain the composite having the carbon nanostructure.

10. The process of claim 9, wherein:
the biomass carbon source and the catalyst have a mass ratio of 1:(0.1-10); and
the catalyst is any one selected from the group consisting of manganese compounds, iron-containing compounds, cobalt-containing compounds and nickel-containing compounds, or a combination of at least two selected therefrom.

11. The process of claim 10, wherein the catalyst is any one selected from the group consisting of ferric chloride, ferrous chloride, ferric nitrate, ferrous nitrate, ferric sulfate, ferrous sulfate, potassium ferricyanide, potassium ferrocyanide, potassium trioxalatoferrate, cobalt chloride, cobalt nitrate, cobalt sulfate, cobalt acetate, nickel chloride, nickel nitrate, nickel sulfate and nickel acetate, or a combination of at least two selected therefrom.

12. The process of claim 9, wherein:
the stirring for catalytic treatment in step (i) is carried out at a temperature of 150-200° C. for 4h or more;
the water content in the precursor is 10 wt% or less;
the temperature rising rate in step (ii) increasing the temperature of the precursor to 280-350° C. is 3-5° C/min;
the protective atmosphere is any one selected from the group consisting of nitrogen, helium and argon, or a combination of at least two selected therefrom;
the washing the crude product in step (iii) is carried out at a temperature of 55-65° C. and includes an acid washing and a water washing in sequence, wherein the acid washing is carried out by using hydrochloric acid having a concentration of 3-6 wt%, and the water washing is carried out by using deionized water and/or distilled water; and
the biomass carbon source is cellulose and/or lignin.

13. A composite polyester fiber comprising:
a composite having a carbon nanostructure, the composite having the carbon nanostructure comprising:
carbon element;
a first non-carbon non-oxygen element substance from 0.5 to 4 wt% of the composite having the carbon nanostructure; the first non-carbon non-oxygen element substance consisting essentially of P, Si, Ca, Al and Na; and
a second non-carbon non-oxygen element from 0 to 4 wt% of the composite having the carbon nanostructure; the second non-carbon non-oxygen element is any one selected from the group consisting of Fe, Ni, Mn, K, Mg, Cr, S or Co, or a combination of at least two selected therefrom;
wherein the G peak and D peak of the carbon element in the Raman spectrum has a D peak to G peak height ratio of 1-20 in the composite having the carbon nanostructure, and optionally, the composite having the carbon nanostructure further has a 2D peak in the Raman spectrum;

wherein the composite having the carbon nanostructure is present in the composite polyester fiber in an amount of 0.1-10 wt%.

14. The composite polyester fiber of claim 13, wherein the composite having the carbon nanostructure has a far-infrared detection normal emissivity of greater than 0.85; and the composite having the carbon nanostructure comprises 80 wt% or more of the carbon element.

15. The composite polyester fiber of claim 13, wherein:
the composite having the carbon nanostructure has a carbon six-membered ring honeycomb lamellar structure having a thickness of 100 nm or less; the carbon six-membered ring honeycomb lamellar structure microscopically showing any one conformation selected from the group consisting of warping, curling and folding, or a combination of at least two selected therefrom;
the first non-carbon non-oxygen element in the composite having the carbon nanostructure is adsorbed on the surface of or inside the carbon nanostructure in any one form selected from the group consisting of simple substance, oxides and carbides, or a combination of at least two selected therefrom; and
the first non-carbon non-oxygen element in the composite having the carbon nanostructure is introduced through biomass carbon sources.

16. A process for preparing the composite polyester fiber of claim 13, the process comprising:
dicing the composite polyester material obtained in claim 13 to obtain a composite polyester masterbatch; and
melt-spinning the composite polyester masterbatch to obtain the polyester fiber compounded from the composite having the carbon nanostructure.

17. The process of claim 16, wherein the melt-spinning process is a pre-oriented yarn process having a yarn extruding temperature of 30-70° C. and a yarn extruding humidity of 10-90%; the yarn extruding is carried out by air cooling or water cooling; the melt is discharged under the conditions of cooling water at a temperature of 20-75° C.; and the melt is discharged at a drawing speed of 0.01-1 m/s.

18. A process for preparing the composite polyester fiber of claim 13, the process comprising:
beating and homogeneously mixing a polyacid, a polyalcohol and the composite having the carbon nanostructure, feeding into a reaction kettle, and then passing through an esterification pre-polymerization stage, a pre-polycondensation stage, and a final polycondensation stage to complete polymerization, so as to obtain a melt;
discharging the melt under the conditions of cooling water at 20-75° C. and a drawing speed of 0.01-1 m/s, directly pelletizing to obtain a masterbatch; and
melt-spinning the masterbatch at a yarn extruding temperature of 30-70° C. and a yarn extruding humidity of 10-90% by air cooling or water cooling, to obtain the composite polyester fiber compounded from the composite having the carbon nanostructure.

* * * * *